(12) United States Patent
Singh et al.

(10) Patent No.: US 11,840,979 B1
(45) Date of Patent: Dec. 12, 2023

(54) GASEOUS FUEL ENGINE SYSTEM AND OPERATING METHOD FOR SAME

(71) Applicant: Caterpillar Inc., Peoria, IL (US)

(72) Inventors: Jaswinder Singh, Dunlap, IL (US); Michael Bardell, Vail, AZ (US); Yongxian Gu, West Lafayette, IN (US); Eric L. Schroeder, Germantown Hills, IL (US); Patrick J. Seiler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/100,003

(22) Filed: Jan. 23, 2023

(51) Int. Cl.
*F02D 41/40* (2006.01)
*F02D 41/00* (2006.01)
*F02D 41/30* (2006.01)

(52) U.S. Cl.
CPC ......... *F02D 41/402* (2013.01); *F02D 41/009* (2013.01); *F02D 41/3094* (2013.01)

(58) Field of Classification Search
CPC ... F02D 41/402; F02D 41/009; F02D 41/3094
USPC ............... 123/299, 300, 525, 520, DIG. 12
See application file for complete search history.

(56) References Cited

U.S. PATENT DOCUMENTS

| 4,223,642 | A | * | 9/1980 | Okubo | C10L 1/1266 |
| | | | | | 123/3 |
| 7,047,934 | B1 | | 5/2006 | Kawabe | |
| 7,487,750 | B2 | | 2/2009 | Leone | |
| 7,980,220 | B2 | | 7/2011 | Boyer | |
| 8,276,550 | B1 | * | 10/2012 | Noguchi | F02D 13/0226 |
| | | | | | 123/304 |
| 8,887,690 | B1 | * | 11/2014 | Sturman | F02M 21/0206 |
| | | | | | 123/294 |
| 11,111,884 | B2 | * | 9/2021 | Pueschel | F02M 25/022 |

FOREIGN PATENT DOCUMENTS

| CN | 111305977 | * | 6/2020 | ............. F02D 41/40 |
| CN | 214997915 | * | 12/2021 | ............. F02D 41/30 |
| CN | 114017179 | * | 2/2022 | ............. F02D 43/10 |
| CN | 114320625 | * | 4/2022 | ............. F02D 41/00 |
| IN | 283299 | B | | 5/2017 |
| JP | 2005155528 | A | | 6/2005 |
| JP | 2006188976 | A | | 7/2006 |
| JP | 6288131 | B2 | | 3/2018 |
| KR | 102027498 | B1 | | 10/2019 |
| WO | 2014053167 | A1 | | 4/2014 |

\* cited by examiner

*Primary Examiner* — Hai H Huynh
(74) *Attorney, Agent, or Firm* — Brannon Sowers & Cracraft PC

(57) ABSTRACT

Operating a gaseous hydrogen fuel engine includes controlling an injection timing of a gaseous hydrogen fuel injected into a flow of pressurized intake air so as to produce a leading cooling flow of pressurized intake air into a cylinder in an engine, a trailing purging flow through an intake conduit, and a middle flow of both pressurized intake air and gaseous hydrogen fuel into the cylinder. Undesired combustion such as preignition and/or backfire can be limited. Related apparatus and control logic is also disclosed.

20 Claims, 4 Drawing Sheets

GASEOUS FUEL ENGINE SYSTEM AND OPERATING METHOD FOR SAME

STATEMENT OF GOVERNMENT INTEREST

This invention was made with government support under contract DE-EE0009422 awarded by DOE. The Government has certain rights in this invention.

TECHNICAL FIELD

The present disclosure relates generally to operating a gaseous fuel engine using gaseous hydrogen fuel, and more particularly to controlling a timing of injection of a gaseous hydrogen fuel to limit undesired combustion.

BACKGROUND

Internal combustion engines are well-known and widely used throughout the world for diverse purposes ranging from vehicle propulsion to operation of pumps and compressors and production of electrical power. A fuel is admitted into one or more cylinders of an engine and ignited to produce a controlled combustion reaction that drives a piston coupled to a crankshaft. All manner of fuel types and operating strategies have been utilized for well over a century.

In recent decades, increased regulatory and commercial attention has been given to reduction of certain emissions from conventional internal combustion engines. Liquid fuel engines operating on petroleum distillate fuels remain in widespread use and will likely remain so for the foreseeable future. Petroleum distillate fuels nevertheless can produce undesired amounts of oxides of nitrogen, particulate matter, and so-called greenhouse gases. Gaseous fuel engines utilizing, for example, natural gas can address some of these concerns particularly with regard to particulate emissions, but nevertheless can produce NOx, carbon dioxide, and carbon monoxide.

In an effort to further refine and manipulate emissions profiles of internal combustion engines, the use of gaseous hydrogen fuel as a primary fuel or a supplement to other gaseous fuels has been the subject of significant engineering efforts in recent years. Gaseous hydrogen fuel offers the promise of minimal undesired emissions. Hydrogen has a relatively low flammability limit, however, and a relatively fast flame speed in situ. For this reason, manufacturers have encountered numerous technical obstacles to successful implementation of gaseous hydrogen fuels, particularly in reciprocating piston engines. One example of a gaseous fuel engine having at least some capacity for operating on hydrogen is known from International Patent Application No. WO2014053167A1.

SUMMARY

In one aspect, a method of operating an engine includes moving an intake valve in an engine from a closed position to an opened position to fluidly connect a cylinder in the engine to an intake conduit feeding pressurized intake air, and injecting a gaseous hydrogen fuel into a flow of the pressurized intake air while the intake valve is opened. The method further includes controlling an injection timing of the gaseous hydrogen fuel relative to a position of the intake valve, and producing, based on the controlling an injection timing of the gaseous hydrogen fuel, a leading cooling flow of pressurized intake air into the cylinder, a trailing purging flow of pressurized intake air through the intake conduit, and a middle flow of both pressurized intake air and the gaseous hydrogen fuel into the cylinder. The method further includes moving the intake valve from the opened position to the closed position, and igniting a combustion charge of the gaseous hydrogen fuel and pressurized intake air in the cylinder.

In another aspect, a method of operating a gaseous hydrogen fuel engine system includes cooling a cylinder in a gaseous hydrogen fuel engine via a flow of pressurized intake air admitted into the cylinder via an intake valve, and starting an injection of a gaseous hydrogen fuel into a flow of the pressurized intake air. The method further includes forming a combustion charge of the gaseous hydrogen fuel and pressurized intake air in the cylinder, and ending the injection of the gaseous hydrogen fuel while the intake valve is open. The method further includes purging an intake port of the gaseous hydrogen fuel with pressurized intake air conveyed into the cylinder via the intake valve after the ending the injection of the gaseous hydrogen fuel. The method still further includes igniting the combustion charge in the cylinder, and limiting undesired combustion of the gaseous hydrogen fuel and pressurized intake air in at least one of the cylinder or the intake port based, respectively, on the cooling of the cylinder and the purging of the intake port.

In still another aspect, a gaseous fuel engine system includes an engine having an engine housing with a cylinder formed therein, an exhaust port, an exhaust valve, an intake port, and an intake valve movable from a closed position to an opened position to fluidly connect the cylinder to the intake port. The engine system further includes an intake conduit having an intake runner forming, together with the intake port, a flow path for conveying a flow of pressurized intake air to the cylinder. The engine system further includes a fuel system having a gaseous hydrogen fuel supply, and a fuel admission valve coupled to the intake runner or the intake port at an injection location, and an igniter positioned in the cylinder to ignite a combustion charge of the gaseous hydrogen fuel and pressurized intake air. The engine system still further includes an engine timing sensor structured to produce an engine timing signal indicative of a position of the intake valve, and an injection control unit coupled to the engine timing sensor and in control communication with the fuel admission valve. The injection control unit is structured to command opening the fuel admission valve to start an injection of the gaseous hydrogen fuel into the flow of pressurized intake air prior to the intake valve reaching the opened position, and to command closing the fuel admission valve to end the injection of the gaseous hydrogen fuel prior to the intake valve returning from the opened position to the closed position. The injection control unit is still further structured to control timings of the commanded opening and the commanded closing of the fuel admission valve to produce a leading cooling flow of the pressurized intake air into the cylinder, a trailing purging flow of the pressurized intake air through the intake conduit, and a middle flow of both the pressurized intake air and the gaseous hydrogen fuel into the cylinder.

DETAILED DESCRIPTION

Figure 1:
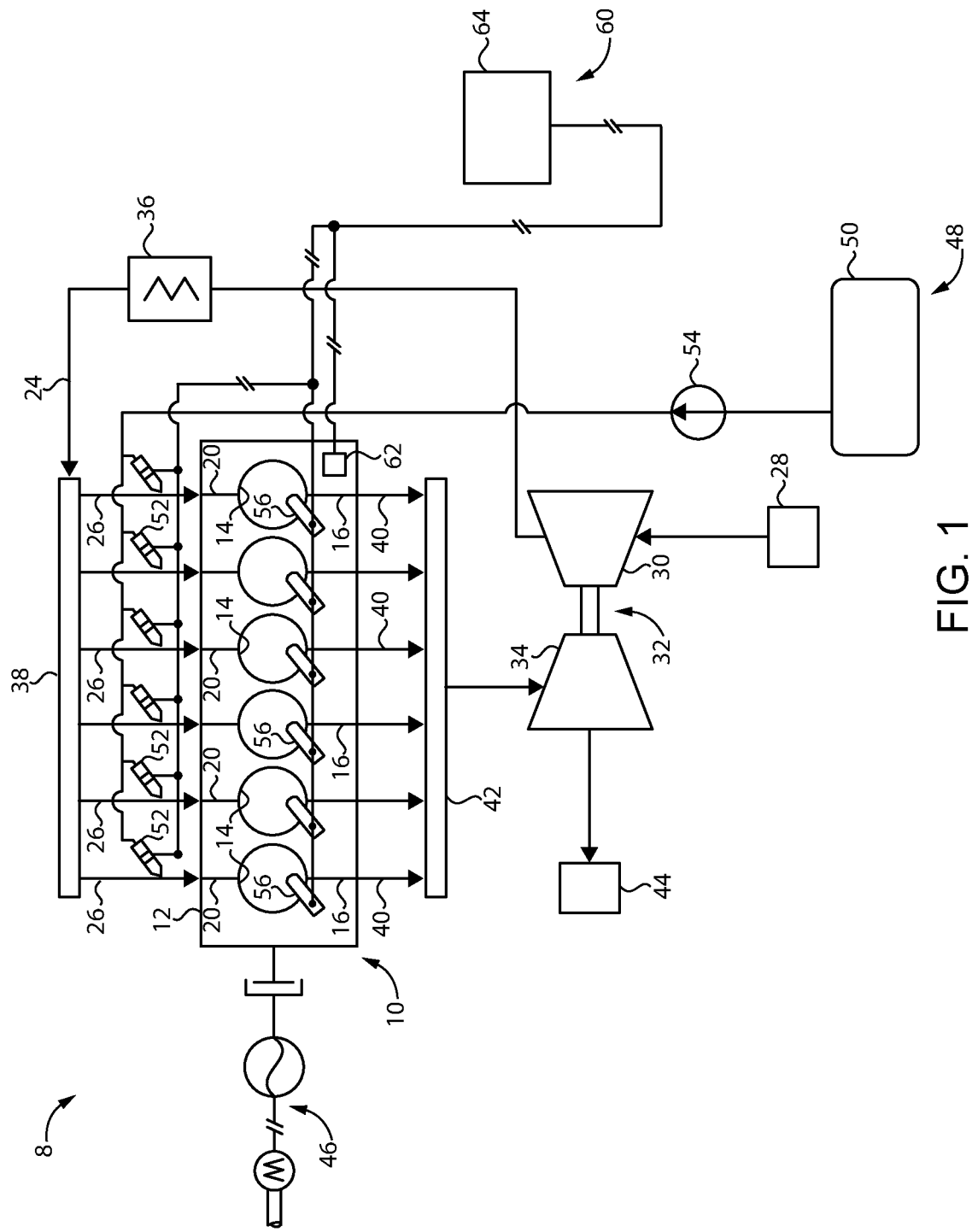
FIG. 1 is a diagrammatic view of a gaseous fuel engine system, according to one embodiment.

Referring to FIG. 1, there is shown a gaseous fuel engine system 8, according to one embodiment. Engine system 8 includes a gaseous fuel engine 10 having an engine housing 12 with a plurality of combustion cylinders 14 formed therein. Engine 10 may include any number of cylinders, including a total of one, in any suitable arrangement such as an in-line pattern, a V-pattern, or still another. Engine 10 further includes a plurality of exhaust ports 16, within engine housing 12, a plurality of intake ports 20 within engine housing 12, along with exhaust valves and intake valves described in connection with subsequent figures.

Engine system 10 also includes an intake conduit 24 including a plurality of intake runners 26. Each intake runner 26 forms, together with a respective one of intake ports 20, a flow path conveying a flow of pressurized intake air to cylinders 14. Intake conduit 24 receives a flow of intake air from a fresh air inlet 28 that is compressed in a compressor 30 of a turbocharger 32. Turbocharger 32 includes a turbine 34. An aftercooler 36 may cool the pressurized intake air fed through intake conduit 24. An intake manifold 38 receives the flow of pressurized intake air and distributes the flow of pressurized intake air to intake runners 26, each in turn feeding the flow of pressurized intake air to one of intake ports 20 and thenceforth to one of cylinders 14. A plurality of exhaust runners 40 extend from cylinders 14 to an exhaust manifold 42. A flow of exhaust is passed through turbine 34 to rotate compressor 30, and thenceforth to an exhaust outlet 44. In some embodiments, aftertreatment equipment could be positioned to mitigate emissions in a flow of exhaust passed through outlet 44. In other instances, no aftertreatment of exhaust from engine 10 may be employed at all.

Engine system 8 further includes a fuel system 48. Fuel system 48 includes a gaseous hydrogen fuel supply 50. Gaseous hydrogen fuel supply 50 may contain gaseous molecular hydrogen in a pressurized state. In some instances, a gaseous hydrogen fuel may be fed to fuel system 48 from a supply conduit connecting to a reformer or another supply of a gaseous hydrogen fuel. Gaseous hydrogen fuels contemplated within the scope of the present disclosure can include gaseous molecular hydrogen as noted above, as well as various blends including gaseous hydrogen typically as a predominant constituent. In many instances gaseous fuel engine system 8 can be operated on substantially pure gaseous molecular hydrogen, natural gas, methane, ethane, biogas, as well as various blends of these. Fuel system 48 may further include at least one pump 54 that transfers gaseous hydrogen fuel, and typically increases a pressure of the gaseous hydrogen fuel to a desired injection pressure. Fuel system 48 also includes a plurality of fuel admission valves 52. Each fuel admission valve 52 will typically be coupled to one of intake runners 26 or to one of intake ports 20 at an injection location. Embodiments are nevertheless contemplated where gaseous hydrogen fuel is injected into intake manifold 38, or admitted elsewhere in engine system 8 including admission by way of fumigation or direct injection.

Engine 10 may be spark-ignited and includes a plurality of igniters 56, each positioned in one of cylinders 14 to ignite a combustion charge of gaseous hydrogen fuel and pressurized intake air therein. Igniters 56 may include prechamber sparkplugs, prechamber ignition devices having a separate and dedicated supply of a fuel such as the gaseous hydrogen fuel or another fuel, or still other electrically operated ignition mechanisms. Each of fuel admission valves 52 may be electrically actuated such as by an electrical control current that energizes a solenoid-operated valve to start an injection of the gaseous hydrogen fuel, and is deenergized to end an injection of the gaseous hydrogen fuel. As noted above, certain challenges in controlling combustion of gaseous hydrogen fuel have been observed. As will be further apparent from the following description, engine system 10 is uniquely configured and operated to limit undesired combustion of gaseous hydrogen fuel such as preignition occurring in cylinders 14, backfiring caused by ignition in intake ports 26, or other forms of undesired combustion including undesired phasing of combustion in some instances.

Engine system 8 further includes an engine timing sensor 62 structured to produce an engine timing signal indicative of a position of intake valves associated with cylinders 14, and an injection control unit 64 in a control system 60. Injection control unit 64 may be coupled to engine timing sensor 62 and in control communication with each of fuel admission valves 52. Injection control unit 64 may include any suitable computerized control unit having a central processing unit (CPU) such as a microprocessor, a microcontroller, or another. Injection control unit 64 may be provided with suitable computer readable memory such as RAM, ROM, SDRAM, FLASH, et cetera, storing program control instructions which, upon execution by a computer processor, cause engine system 8 to operate in the manner disclosed herein.

Engine system 8 may be used in a variety of applications including for operating a drivetrain in a mobile land vehicle or a marine vessel, operating a pump or a compressor such as for conveyance of gases or liquids, and for electrical power generation. In the illustrated embodiment engine system 8 is coupled to a load 46 including an electrical generator that operates an electric motor. In an electric power application engine system 8 may also be used to provide electric power to a local or regional power grid, or to charge energy storage devices to name a few examples.

Figure 2:
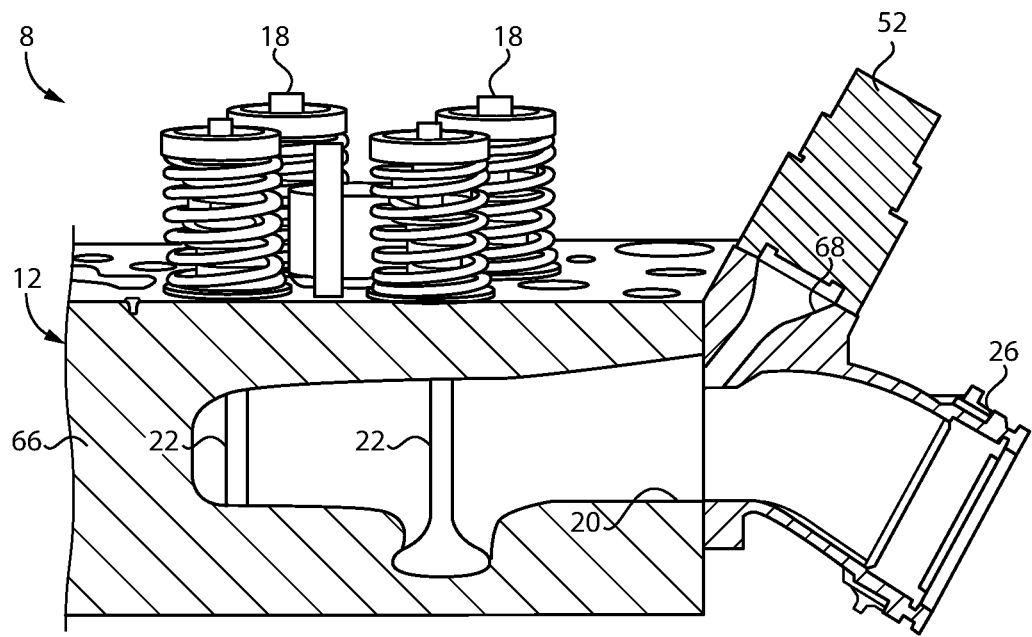
FIG. 2 is a partially sectioned side diagrammatic view of a portion of a gaseous fuel engine system, according to one embodiment.

Referring also now to FIG. 2, there are shown additional exemplary features of engine system 8 including an engine head 66 of engine housing 12. As noted above, each fuel admission valve 52, hereinafter referred to at times in the singular, may be coupled to intake runner 26 or to intake port 20 at an injection location. In the embodiment illustrated in FIG. 2, the injection location is defined by a fuel admission opening 68 formed in intake runner 26. Intake runner 26 is attached to engine head 66 to feed pressurized intake air into intake port 20. Fuel admission valve 52 may be operated to inject the gaseous hydrogen fuel into intake runner 26 such that the gaseous hydrogen fuel injected is carried with the flow of pressurized intake air into an associated one of cylinders 14. Also shown in FIG. 2 are a plurality of exhaust valves 18 and a plurality of intake valves 22, each associated with a corresponding one of cylinders 14. Intake valves 22, hereinafter referred to at times in the singular, are movable from a closed position to an opened position to fluidly connect the corresponding cylinder 14 to intake port 20. As further discussed herein, by selectively timing a start of fuel injection and an end of fuel injection different flow combinations of pressurized intake air and gaseous hydrogen fuel can be supplied into the corresponding cylinder 14 having desirable effects respecting limiting undesired combustion.

To this end, injection control unit 64 may be structured to command opening fuel admission valve 52 to start an injection of gaseous hydrogen fuel into a flow of pressurized intake air fed through intake runner 26 and intake port 20 prior to intake valve 22 reaching the opened position. Injection control unit 64 may further be structured to command closing fuel admission valve 52 to end the injection of gaseous hydrogen fuel prior to intake valve 22 returning from the opened position to the closed position. Injection control unit 64 may further be structured to control timings of the commanded opening and the commanded closing of fuel admission valve 52 to produce a leading cooling flow of pressurized intake air into cylinder 14, a trailing purging flow of the pressurized intake air through intake conduit 24 and intake runner 26 and intake port 20, and a middle flow of both the pressurized intake air and the gaseous hydrogen fuel into the cylinder.

It can thus be appreciated that based on the controlling an injection timing of the gaseous hydrogen fuel, a leading cooling flow may be produced of pressurized intake air into cylinder 14, a trailing purging flow of pressurized intake air through intake conduit 24, and a middle flow of both pressurized intake air and gaseous hydrogen fuel. The leading cooling flow may include substantially only pressurized intake air that cools internal surfaces forming cylinder 14. In some embodiments, however, the leading cooling flow may contain some gaseous hydrogen fuel. The trailing purging flow may include substantially only the pressurized intake air, and the middle flow contain both pressurized intake air and gaseous hydrogen fuel. In a refinement, controlling an injection timing of the gaseous hydrogen fuel may include starting the injection of the gaseous hydrogen fuel prior to intake valve 22 reaching the opened position, and ending the injection of the gaseous hydrogen fuel prior to intake valve 22 reaching the closed position. In a further refinement, controlling an injection timing of the gaseous hydrogen fuel may include starting the injection of the gaseous hydrogen fuel after commencing moving intake valve 22 from the closed position toward the opened position.

The concepts contemplated herein can therefore be understood to provide an initial flow that cools cylinder 14, a middle flow that contains some or all of the gaseous hydrogen fuel that will form a combustion charge, and a trailing flow substantially free of gaseous hydrogen fuel that purges intake port 20. Accordingly, preignition in cylinder 14 can be limited or eliminated by way of cooler temperatures than what might otherwise exist. Risk of backfire based on residual gaseous hydrogen fuel in intake port 20 can also be reduced. Following producing the leading cooling flow, trailing purging flow, and middle flow, intake valve 22 may be moved back to the closed position, and igniter 56 energized to ignite a combustion charge of the gaseous hydrogen fuel and pressurized intake air in cylinder 14.

Figure 3:
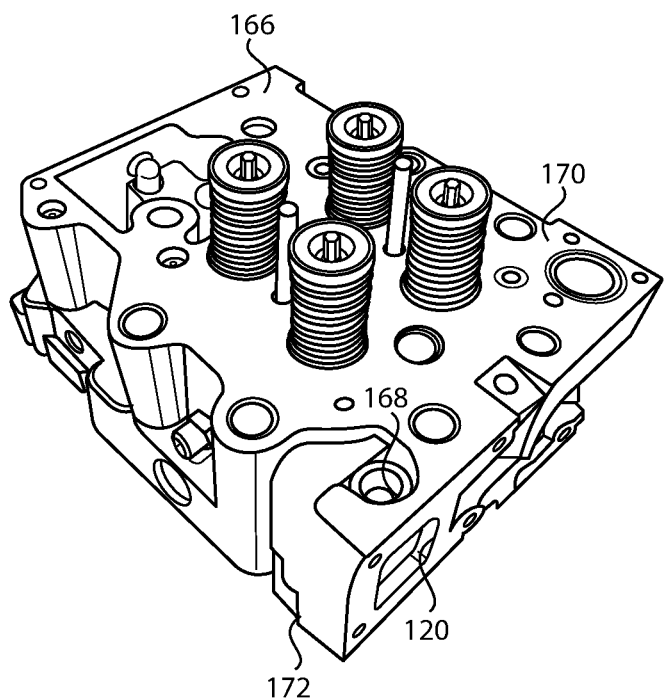
FIG. 3 is a diagrammatic view of an engine head assembly, according to one embodiment.

It will be recalled in the illustration of FIG. 2 an injection location of intake conduit 24 upstream of engine housing 66 is defined by fuel admission opening 68 in intake runner 26. Referring now to FIG. 3, there is shown an engine head 66 according to another embodiment, and usable in engine applications similar to engine system 8 but differing in respect of a location of injection of gaseous hydrogen fuel. Engine head 166 includes formed therein an intake port 120 and a fuel admission opening 168. Fuel admission opening 168 is formed in engine head 166, thus formed in an engine housing directly. Engine head 166 includes an upper surface 170, and a lower surface 172. Thus, injection of gaseous hydrogen fuel can occur downwardly through upper surface 170 and directly into intake port 120.

Figure 4:
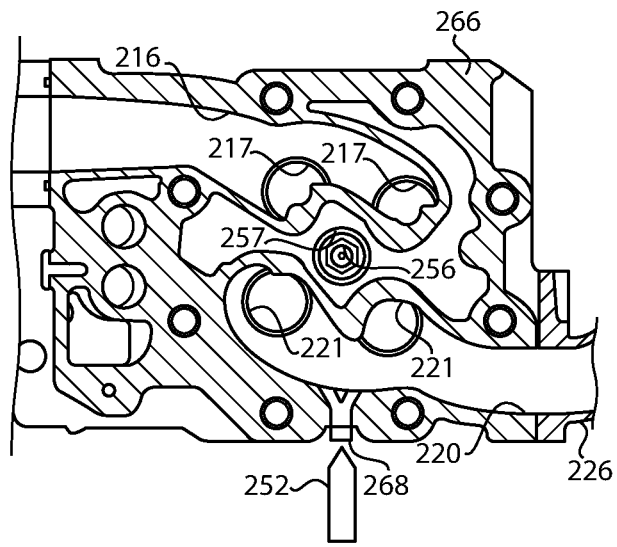
FIG. 4 is a top view of an engine head assembly, according to one embodiment.

Turning to FIG. 4, there is shown an engine head 266 according to yet another embodiment. Engine head 266 includes an intake port 220 coupled to an intake runner 226, and an exhaust port 216. Intake openings 221 will be understood to fluidly connect intake port 220 to a cylinder. Exhaust openings 217 formed in engine head 266 will analogously be understood to fluidly connect the cylinder to exhaust port 216. An igniter bore 257 is centrally located among intake openings 221 and exhaust openings 217. An igniter, such as a sparkplug, is shown at 256 and supported in igniter bore 257. In FIG. 4 a fuel admission opening 268 extends horizontally through engine head 266 to fluidly connect to intake port 220. A fuel admission valve 252 is shown coupled to fuel admission opening 268. In the embodiment of FIG. 4 the horizontally extending fuel admission opening 268 is shown fluidly connecting to intake port 220 generally between the two intake openings 221 in a right-to-left direction.

Figure 5:
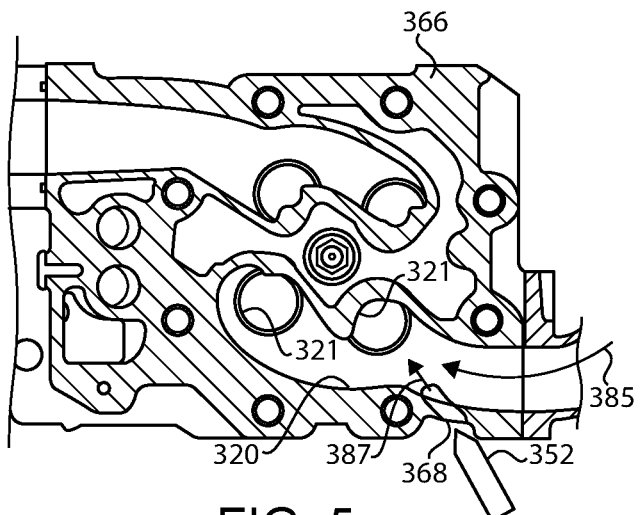
FIG. 5 is a top view of an engine head assembly, according to one embodiment.

Turning now to FIG. 5, there is shown an engine head 366 according to yet another embodiment, including an intake port 320, intake openings 321, and a fuel admission opening 368. Similar to the embodiments of FIG. 3 and FIG. 4, in the embodiment of FIG. 5, the fuel admission opening 368 extends through engine head 366 to directly connect to intake port 320. In contrast to those prior embodiments, an incoming flow of gaseous hydrogen fuel 387 can be injected generally aligned with an incoming flow direction 385 of pressurized intake air. A fuel admission valve is shown at 352.

Figure 6:
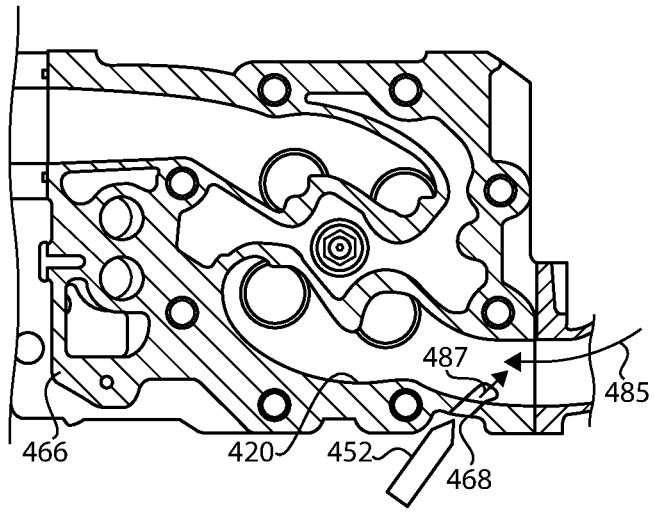
FIG. 6 is a top view of an engine head assembly, according to one embodiment.

Turning to FIG. 6, there is shown an engine head 466 according to yet another embodiment and including an intake port 420. A fuel admission valve 452 is shown coupled to a fuel admission opening 468. In the embodiment of FIG. 6, an incoming direction of injected gaseous hydrogen fuel 487 is in opposition to an incoming flow direction of pressurized intake air 485. Enhanced mixing of the hydrogen fuel in the embodiment of FIG. 6 might be observed relative to the embodiments of FIGS. 3-5, however, each different embodiment may have different inherent advantages and applications.

INDUSTRIAL APPLICABILITY

Figure 7:
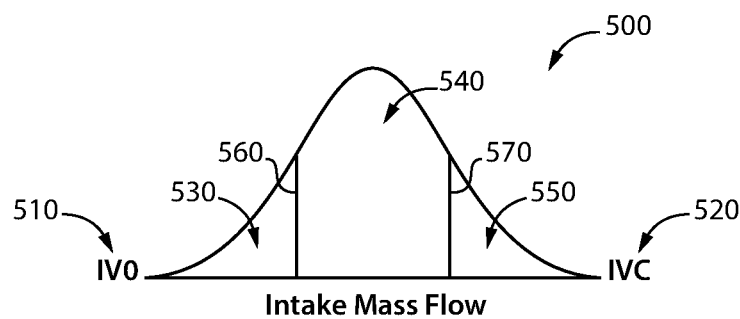
FIG. 7 is a concept diagram of intake mass flow between an intake valve opening timing and an intake valve closing timing, according to one embodiment.

Referring to the drawings generally, but also now to FIG. 7, there is shown a concept diagram 500 illustrating an intake mass flow through an intake valve between intake valve opening 510 and intake valve closing 520. It will be recalled that controlling an injection timing of gaseous hydrogen fuel according to the present disclosure may produce a leading cooling flow of pressurized intake air into a cylinder. In FIG. 7 following intake valve opening 510 a leading cooling flow 530 may be produced as the intake valve commences opening but prior to a start of injection of gaseous hydrogen fuel at 560. A middle flow of both pressurized intake air and gaseous hydrogen fuel follows the start of injection 560 and is shown at 540. An end of injection is shown at 570. A trailing purging flow of pressurized intake air is shown at 550 occurring prior to intake valve closing 520.

It will be recalled that injection control unit 64 receives an engine timing signal from engine timing sensor 62, such as a crank angle timing signal. The engine timing signal may thus be indicative of a position of each of the intake valves in engine 10. Accordingly, injection control unit 64 can be understood to control the start of injection and end of injection of gaseous hydrogen fuel based on a position of an intake valve. It will be recalled that gaseous hydrogen may have a relatively lower flammability limit, generally meaning that ignition of gaseous hydrogen fuel can be achieved at relatively low concentrations. In view of the lower flammability limit of gaseous hydrogen fuel, injection control unit 64 can meter injection of gaseous hydrogen fuel to provide as much gaseous hydrogen fuel as is practicable without reaching or exceeding the lower flammability limit. FIG. 7 illustrates the generally gradual delivery of gaseous hydrogen fuel substantially at an injection timing that is substantially in phase with a valve timing of the intake valve.

In a refinement the leading cooling flow need not be entirely free of gaseous hydrogen fuel but can contain some gaseous hydrogen fuel. Accordingly, metering the injection of the gaseous hydrogen fuel can include metering the injection such that the leading cooling flow contains a first quantity of the gaseous hydrogen fuel, and the middle flow 540 contains a second quantity of the gaseous hydrogen fuel typically larger than the first quantity. Metering the injection of the gaseous hydrogen fuel can also include apportioning a total quantity of the injected gaseous hydrogen fuel between the first quantity and the second quantity based on at least one of an engine speed or an engine load. It has been observed that at higher engine speeds and higher engine loads, gaseous hydrogen fuel may be more readily ignited even in the absence of an ignition source such as a spark. Accordingly, by providing some initial gaseous hydrogen fuel in a leading cooling flow, and providing more gaseous hydrogen fuel in the middle flow, a total quantity of the gaseous hydrogen fuel may be maximized without reaching or exceeding the lower flammability limit.

Figure 8:
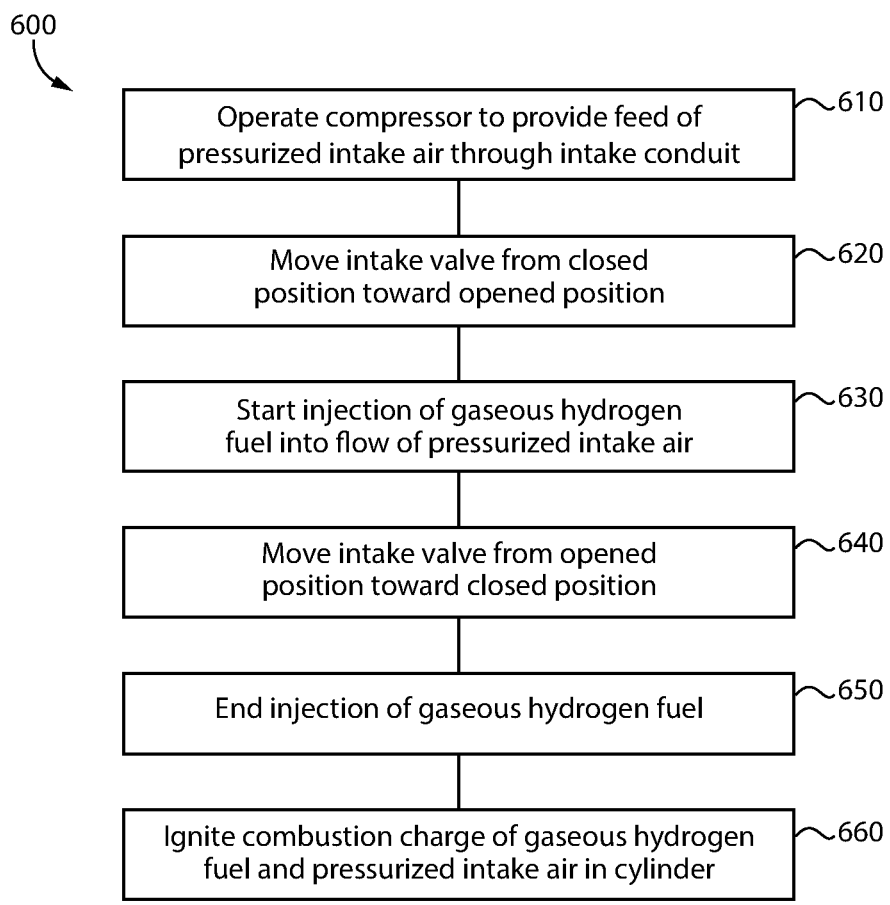
FIG. 8 is a flowchart illustrating example methodology and logic flow, according to one embodiment.

Turning now to FIG. 8, there is shown a flowchart 600 illustrating example methodology and logic flow, according to one embodiment. At a block 610 a compressor is operated to provide a feed of pressurized intake air through the intake conduit. From block 610 flowchart 600 advances to a block 620 to move the intake valve from a closed position toward an opened position. From block 620 flowchart 600 advances to a block 630 to start the injection of gaseous hydrogen fuel into the flow of pressurized intake air. From block 630 flowchart 600 advances to a block 640 to move the intake valve from the opened position toward the closed position. From block 640 flowchart 600 advances to a block 650 to end the injection of gaseous hydrogen fuel. From block 650 flowchart 600 advances to a block 660 to ignite the combustion charge of gaseous hydrogen fuel and pressurized intake air in the cylinder.

The present description is for illustrative purposes only, and should not be construed to narrow the breadth of the present disclosure in any way. Thus, those skilled in the art will appreciate that various modifications might be made to the presently disclosed embodiments without departing from the full and fair-scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:
   moving an intake valve in an engine from a closed position to an opened position to fluidly connect a cylinder in the engine to an intake conduit feeding pressurized intake air;
   injecting a gaseous hydrogen fuel into a flow of the pressurized intake air while the intake valve is opened;
   controlling an injection timing of the gaseous hydrogen fuel relative to a position of the intake valve;
   producing, based on the controlling an injection timing of the gaseous hydrogen fuel, a leading cooling flow of pressurized intake air into the cylinder, a trailing purging flow of pressurized intake air through the intake conduit, and a middle flow of both pressurized intake air and the gaseous hydrogen fuel into the cylinder;
   moving the intake valve from the opened position to the closed position; and
   igniting a combustion charge of the gaseous hydrogen fuel and pressurized intake air in the cylinder.

2. The method of claim 1 wherein the injecting a gaseous hydrogen fuel includes admitting the gaseous hydrogen fuel to be injected at an injection location of the intake conduit that is upstream of an engine housing of the engine.

3. The method of claim 2 wherein the injection location is defined by a fuel admission opening in an intake runner of the intake conduit.

4. The method of claim 1 wherein the injecting a gaseous hydrogen fuel includes injecting the gaseous hydrogen fuel into the intake port through a fuel admission opening formed in the engine housing.

5. The method of claim 1 wherein the controlling an injection timing of the gaseous hydrogen fuel includes starting the injection of the gaseous hydrogen fuel prior to the intake valve reaching the opened position, and ending the injection of the gaseous hydrogen fuel prior to the intake valve reaching the closed position.

6. The method of claim 5 wherein the controlling an injection timing of the gaseous hydrogen fuel further includes starting the injection of the gaseous hydrogen fuel after commencing the moving the intake valve from the closed position.

7. The method of claim 1 wherein the controlling an injection timing of the gaseous hydrogen fuel includes injecting the gaseous hydrogen fuel at an injection timing substantially in phase with a valve timing of the intake valve.

8. The method of claim 1 wherein the injecting a gaseous hydrogen fuel further includes metering the injection of the gaseous hydrogen fuel, such that the leading cooling flow contains a first quantity of the gaseous hydrogen fuel, and the middle flow contains a second quantity of the gaseous hydrogen fuel larger than the first quantity.

9. The method of claim 8 wherein the metering the injection of the gaseous hydrogen fuel includes apportioning a total quantity of the injected gaseous hydrogen fuel between the first quantity and the second quantity based on at least one of an engine speed or an engine load.

10. The method of claim 9 further comprising limiting an amount of the gaseous hydrogen fuel in the cylinder below a lower flammability limit based on the metering the injection of the gaseous hydrogen fuel.

11. A method of operating a gaseous hydrogen fuel engine system comprising:

cooling a cylinder in a gaseous hydrogen fuel engine via a flow of pressurized intake air admitted into the cylinder via an intake valve;

starting an injection of a gaseous hydrogen fuel into a flow of the pressurized intake air;

forming a combustion charge of the gaseous hydrogen fuel and pressurized intake air in the cylinder;

ending the injection of the gaseous hydrogen fuel while the intake valve is open;

purging an intake port of the gaseous hydrogen fuel with pressurized intake air conveyed into the cylinder via the intake valve after the ending the injection of the gaseous hydrogen fuel;

igniting the combustion charge in the cylinder; and limiting undesired combustion of the gaseous hydrogen fuel and pressurized intake air in at least one of the cylinder or the intake port based, respectively, on the cooling of the cylinder and the purging of the intake port.

12. The method of claim 11 further comprising injecting the gaseous hydrogen fuel according to an injection timing substantially in phase with a valve timing of the intake valve.

13. The method of claim 11 further comprising metering the injection of the gaseous hydrogen fuel, such that a leading flow cooling the cylinder includes some gaseous hydrogen fuel, and a trailing flow purging the intake port is substantially free of the gaseous hydrogen fuel.

14. The method of claim 13 wherein the metering the injection of the gaseous hydrogen fuel includes apportioning a total quantity of the gaseous hydrogen fuel between the leading flow containing a smaller quantity of the gaseous hydrogen fuel and a middle flow containing a larger quantity of the gaseous hydrogen fuel to maintain a quantity of the gaseous hydrogen fuel in the cylinder below a lower flammability limit.

15. The method of claim 14 further comprising varying the metering of gaseous hydrogen fuel cycle-to-cycle based on at least one of an engine speed or an engine load.

16. The method of claim 11 wherein the gaseous hydrogen fuel is admitted into an intake conduit at a location that is upstream of an engine housing of the engine.

17. A gaseous fuel engine system comprising:

an engine including an engine housing having a cylinder formed therein, an exhaust port, an exhaust valve, an intake port, and an intake valve movable from a closed position to an opened position to fluidly connect the cylinder to the intake port;

an intake conduit including an intake runner forming, together with the intake port, a flow path for conveying a flow of pressurized intake air to the cylinder;

a fuel system including a gaseous hydrogen fuel supply, and a fuel admission valve coupled to the intake runner or the intake port at an injection location;

an igniter positioned in the cylinder to ignite a combustion charge of the gaseous hydrogen fuel and pressurized intake air;

an engine timing sensor structured to produce an engine timing signal indicative of a position of the intake valve; and an injection control unit coupled to the engine timing sensor and in control communication with the fuel admission valve, the injection control unit structured to:

command opening the fuel admission valve to start an injection of the gaseous hydrogen fuel into the flow of pressurized intake air prior to the intake valve reaching the opened position;

command closing the fuel admission valve to end the injection of the gaseous hydrogen fuel prior to the intake valve returning from the opened position to the closed position; and control timings of the commanded opening and the commanded closing of the fuel admission valve to produce a leading cooling flow of the pressurized intake air into the cylinder, a trailing purging flow of the pressurized intake air through the intake conduit, and a middle flow of both the pressurized intake air and the gaseous hydrogen fuel into the cylinder.

18. The engine system of claim 17 wherein the injection control unit is further structured to meter the injection of the gaseous fuel based on at least one of an engine speed or an engine load so as to maintain a total quantity of the gaseous hydrogen fuel in the cylinder below a lower flammability limit based on the at least one of an engine speed or an engine load.

19. The engine system of claim 17 wherein the injection location is defined by a fuel admission opening formed in the engine housing.

20. The engine system of claim 17 wherein the injection location is defined by a fuel admission opening formed in the intake runner.

* * * * *